United States Patent
Macdonald (10) Patent No.: US 8,922,163 B2
(45) Date of Patent: Dec. 30, 2014

(54) AUTOMATED BATTERY AND DATA DELIVERY SYSTEM

(76) Inventor: Murray Macdonald, West Vancouver (CA)

(*) Notice: Subject to any disclaimer, the term of this patent is extended or adjusted under 35 U.S.C. 154(b) by 423 days.

(21) Appl. No.: 13/265,803

(22) PCT Filed: Apr. 15, 2010

(86) PCT No.: PCT/CA2010/000557
§ 371 (c)(1),
(2), (4) Date: Oct. 21, 2011

(87) PCT Pub. No.: WO2010/121356
PCT Pub. Date: Oct. 28, 2010

(65) Prior Publication Data
US 2012/0045303 A1    Feb. 23, 2012

Related U.S. Application Data

(60) Provisional application No. 61/172,649, filed on Apr. 24, 2009.

(51) Int. Cl.
| | | |
|---|---|---|
| *H02J 7/00* | (2006.01) | |
| *G06F 19/00* | (2011.01) | |
| *A47F 10/00* | (2006.01) | |
| *H01M 10/46* | (2006.01) | |

(52) U.S. Cl.
CPC .............. *A47F 10/00* (2013.01); *H01M 10/46* (2013.01)
USPC ........................................ 320/109; 700/245

(58) Field of Classification Search
CPC ...................................................... B65G 1/00
USPC .......... 320/109, 128, 137, DIG. 34; 700/245, 700/253, 258; 901/1
See application file for complete search history.

(56) References Cited

U.S. PATENT DOCUMENTS

| | | | | |
|---|---|---|---|---|
| 4,450,400 A | * | 5/1984 | Gwyn ........................... | 320/109 |
| 4,492,504 A | * | 1/1985 | Hainsworth ................... | 414/273 |
| 4,983,903 A | * | 1/1991 | Bae et al. ...................... | 320/128 |
| 4,987,834 A | * | 1/1991 | Peck et al. .................... | 104/300 |
| 5,187,423 A | * | 2/1993 | Marton ......................... | 320/109 |
| 5,544,784 A | * | 8/1996 | Malaspina .................... | 221/135 |
| 5,545,967 A | * | 8/1996 | Osborne et al. ............... | 320/109 |

(Continued)

OTHER PUBLICATIONS

Canadian Intellectual Property Office, International Search Report and Written Opinion, International Application No. PCT/ CA2010/000557, dated Jul. 30, 2010, 9 pages.

*Primary Examiner* — Richard V Muralidar
(74) *Attorney, Agent, or Firm* — Stoel Rives LLP (57) ABSTRACT

Systems and methods are provided that use a mobile robotic device to transport rechargeable batteries between a base station, which charges the batteries, and a battery operated device, such as battery powered kiosk or signage system, which uses a charged battery as a power source. After traveling to a battery operated device, the mobile robotic device removes any discharged batteries from the battery operated device and installs a charged battery. The mobile robotic device then travels to the base station and attaches the discharged battery to the base station for recharging. The mobile robotic device may be configured to perform other transfers, such as data transfers and paper transfers. In addition, the mobile robotic device may be configured to perform a photographic and spatial survey of the isles, retail shelves, and surrounding environment for various purposes, such as generating three-dimensional store models and remote viewing.

14 Claims, 5 Drawing Sheets

(56) References Cited

U.S. PATENT DOCUMENTS

| | | | |
|---|---|---|---|
| 5,612,606 A * | 3/1997 | Guimarin et al. | 320/109 |
| 5,852,353 A * | 12/1998 | Kochanneck | 318/558 |
| 6,094,028 A * | 7/2000 | Gu et al. | 320/109 |
| 6,324,650 B1 * | 11/2001 | Ogilvie | 726/2 |
| 6,371,230 B1 * | 4/2002 | Ciarla et al. | 180/68.5 |
| 6,443,543 B1 * | 9/2002 | Chiang | 312/223.3 |
| 6,584,375 B2 | 6/2003 | Bancroft et al. | |
| 6,771,878 B1 * | 8/2004 | Caramico et al. | 386/243 |
| 6,801,834 B1 * | 10/2004 | Konshak et al. | 700/245 |
| 6,817,824 B2 * | 11/2004 | Winkler | 414/273 |
| 6,822,422 B2 * | 11/2004 | Sagawa | 320/109 |
| 7,004,710 B1 * | 2/2006 | Quade | 414/395 |
| 7,152,789 B2 * | 12/2006 | Hasegawa et al. | 235/383 |
| 7,206,753 B2 | 4/2007 | Bancroft et al. | |
| 7,255,191 B2 * | 8/2007 | Baldwin et al. | 180/220 |
| 7,271,725 B2 * | 9/2007 | Sugiyama | 340/572.1 |
| 8,022,812 B2 * | 9/2011 | Beniyama et al. | 340/10.1 |
| 2002/0165643 A1 | 11/2002 | Bancroft et al. | |
| 2004/0093650 A1 * | 5/2004 | Martins et al. | 901/1 |
| 2004/0143373 A1 * | 7/2004 | Ennis | 701/1 |
| 2005/0018216 A1 * | 1/2005 | Barsness et al. | 358/1.6 |
| 2005/0047777 A1 * | 3/2005 | Molldrem, Jr. | 396/564 |
| 2005/0156562 A1 | 7/2005 | Cohen et al. | |
| 2005/0238465 A1 | 10/2005 | Razumov | |
| 2006/0214634 A1 * | 9/2006 | Baba | 320/114 |
| 2007/0201103 A1 * | 8/2007 | Morgan | 358/400 |
| 2007/0250212 A1 | 10/2007 | Halloran et al. | |
| 2008/0077511 A1 * | 3/2008 | Zimmerman | 705/28 |

* cited by examiner

AUTOMATED BATTERY AND DATA DELIVERY SYSTEM

RELATED APPLICATIONS

This application is a national stage application under 35 U.S.C. 371 of International Application No. PCT/CA2010/000557, filed Apr. 15, 2010, which claims the benefit under 35 U.S.C. §119(e) of U.S. Provisional Application No. 61/172,649, filed Apr. 24, 2009, which is hereby incorporated by reference in its entirety.

TECHNICAL FIELD

This disclosure relates to delivering power and data to battery operated devices, such as kiosks and signage devices, in a retail environment and, more particularly, to an automated battery and data delivery system.

BACKGROUND INFORMATION

Kiosks and digital signage devices are commonly available devices typically located in retail environments. Kiosks are computerized devices that allow customers to access information, place orders, and make purchases. Digital signage devices are electronic display devices that present information, advertising, and other messages to customers. Kiosks and digital signage devices require a source of power to operate and typically require an electrical receptacle to be installed nearby the kiosk or digital signage device. In addition, kiosks and digital signage devices generally require frequent data updates and may require a network connection to be installed nearby the kiosk or digital signage device or may require the retail environment to deploy a wireless network. The expertise, regulation, and costs associated with installing electrical receptacles, network connections, and wireless networks are prohibiting factors of installing kiosks and digital signage devices and can greatly limit the scope of kiosk and digital signage device deployments. Thus, the present inventor has recognized a need for improved systems and methods for delivering power and data to battery operated devices, such as kiosks and signage devices, in a retail environment.

DETAILED DESCRIPTION OF PREFERRED EMBODIMENTS

With reference to the above-listed drawings, this section describes particular embodiments and their detailed construction and operation. The embodiments described herein are set forth by way of illustration only. In light of the teachings herein, those skilled in the art will recognize that there may be equivalents to what is expressly or inherently taught herein. For example, variations can be made to the embodiments described herein and other embodiments are possible. It is not always practical to exhaustively catalog all possible embodiments and all possible variations of the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 1:
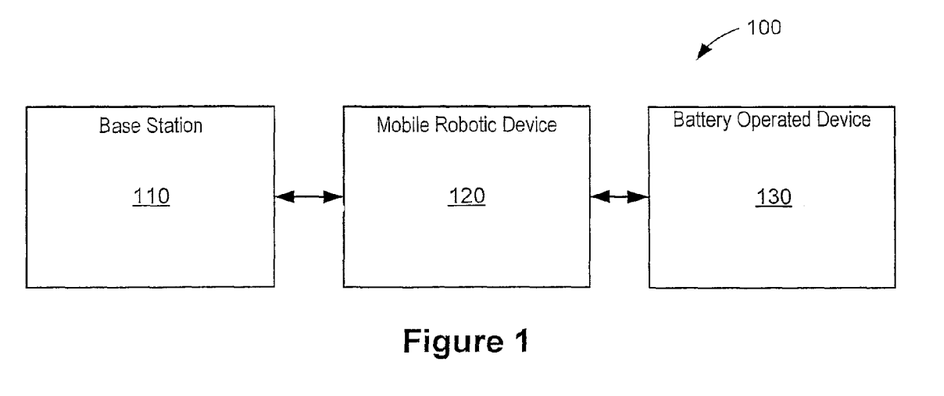
FIGS. 1 and 2 are high-level block diagrams of automated power delivery systems, according to various embodiments.

FIG. 1 is a high-level block diagram of automated battery delivery system 100, according to one embodiment. Automated battery delivery system 100 uses one or more mobile robotic devices 120 to deliver and exchange one or more batteries between a set of base stations 110, which charge the batteries, and a set of battery operated devices 130, which use the batteries as a power source. Mobile robotic devices 120 preferably operate autonomously within an operational environment, such as a retail environment. Thus, mobile robotic devices 120 automatically fetch, install, exchange, recharge, transport, and deliver rechargeable batteries to battery operated devices 130. In addition, mobile robotic devices 120 may be configured to perform other transfers, such as data transfers and paper transfers. Further, mobile robotic devices 120 may be configured to perform a photographic and spatial survey of the isles, retail shelves, and surrounding environment for various purposes, such as generating three-dimensional store models (e.g., map the photographic data onto a three-dimensional store model for easy navigation) and remote viewing.

Automated battery delivery system 100 may include one or more base stations 110. Base stations 110 are generally remotely located from battery operated devices 130, such as in a storage room, warehouse, or other space that may be inaccessible to customers. Base stations 110 are electrically coupled to a power source, such as an electrical receptacle, and are configured to charge one or more batteries. Thus, base stations 110 function as battery recharging stations. Base stations 110 may include a transmitter to help guide a mobile robotic device to the base station. Base stations 110 may also include a network connection, such as an Internet connection, to exchange data with one or more central servers or remote data stores.

Figure 2:
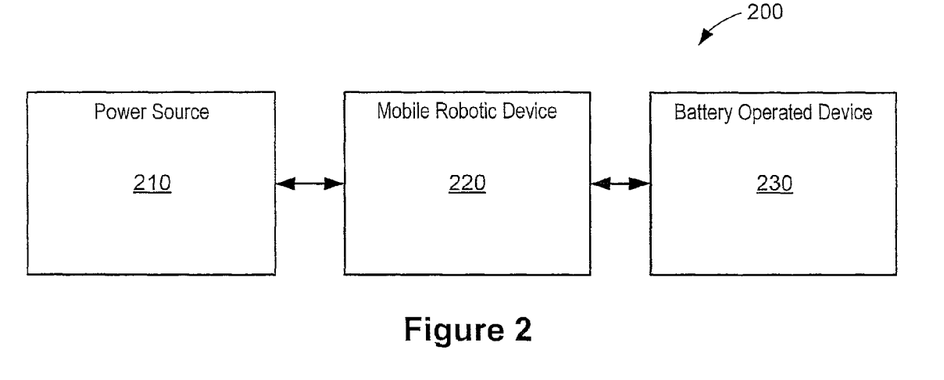

FIG. 2 is a high-level block diagram of automated energy delivery system 200, according to one embodiment. Automated energy delivery system 200 uses one or more mobile robotic devices 220 to deliver electrical energy to a set of battery operated devices 230. Mobile robotic devices 220 preferably include an energy storage device, such as a battery or capacitor, and charge the energy storage device using one or more power sources 210, such as an electrical receptacle. Power sources 210 may be remotely located from battery operated devices 230 and may be located in areas that are accessible or inaccessible to customers (e.g., the power source may comprise the closest electrical receptacle). Thus, instead of delivering one or more batteries to battery operated devices 230, mobile robotic devices 220 deliver electrical energy or a charge to battery operated devices 230. The electrical energy may then be used to charge the battery operated device. Mobile robotic devices 220 preferably operate autonomously within an operational environment, such as a retail environment.

One or more of battery operated devices 130 or battery operated devices 230 may comprise a digital signage device.

Figure 3:
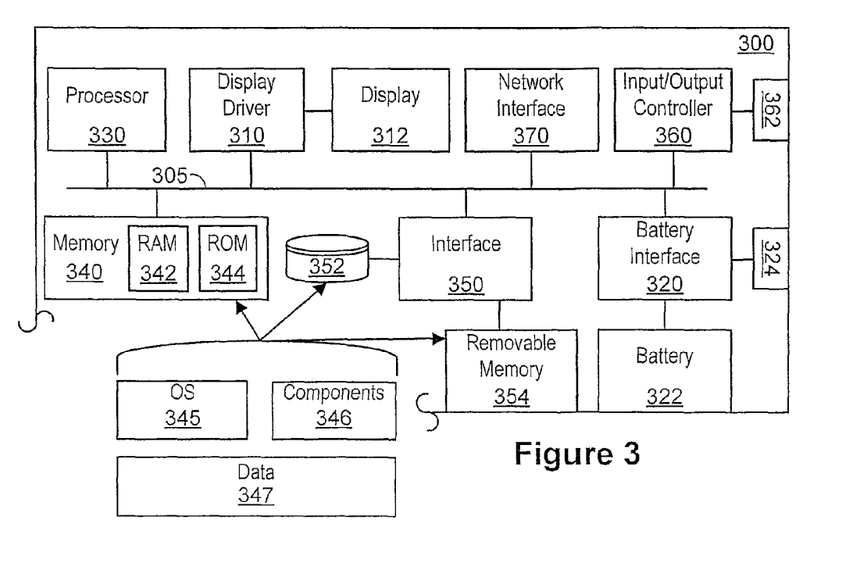
FIGS. 3 and 4 are block diagrams showing operational components of battery operated devices, according to various embodiments.

FIG. 3 is a functional block diagram of one illustrative architecture of a digital signage device 300. In FIG. 3, a bus-based architecture is illustrated, based on a bus 305. Other types of architectures are also suitable, such a direct connection between one or more of the components. A number of components interface to the bus 305, including a display driver 310, a battery interface 320, a processor 330, a memory 340, a memory interface 350, an input/output controller 360, and a network interface 370. Other versions of digital signage device 300 may omit one or more of these components, may contain additional components, or both.

Display driver 310 interfaces with processor 330 and a display 312 to present, for example, in textual form, graphical form, or both, data or other information stored in one or more of memories 340 and 352. For example, display 312 may present information, advertising, and other messages. Display 312 may comprise any display device, such as an integrated cathode ray tube (CRT), liquid crystal display (LCD), or other display device.

Battery interface 320 interfaces with processor 330 and battery 322 to, for example, detect a charge level of battery 322. If the charge level of battery 322 falls below a certain threshold, processor 330 may be configured to transmit via network interface 370 a message indicating that battery 322 needs replacing or needs to be recharged. Network interface 370 may directly communicate with any of mobile robotic devices 120 or 220 or may communicate with a central monitoring system, which may direct a mobile robotic device to service digital signage device 300. Processor 330 may also be configured to transmit via a transmitter a signal indicative of the state of battery 322. For example, if a charge level of battery 322 falls below a certain threshold, the transmitter may begin sending a signal indicating that a mobile robotic device should replace or charge battery 322. By way of another example, the transmitter may transmit a signal when battery 322 has a normal charge level and stop transmitting the signal when a charge level of battery 322 falls below a certain threshold. Battery interface 320 may be omitted in certain embodiments.

According to a preferred embodiment, battery 322 comprises a rechargeable battery, such as a nickel-metal-hydride or lithium-ion battery, having a charge capacity sufficient to power digital signage device 300 for several hours (e.g., eight hours). However, battery 322 may comprise a non-rechargeable battery and may comprise any electrical or electrochemical device, such as galvanic cells or electrolytic cells. As will be described with reference to FIGS. 5A and 5B, battery 322 may be housed within a battery compartment of digital signage device 300 or may be externally coupled to digital signage device 300. If battery 322 comprises a rechargeable battery, battery 322 may be recharged in a number of ways. For example, a mobile robotic device may physically detach or remove battery 322 from digital signage device 300 to allow charging by one of base stations 110. By way of another example, an access port 324 may be provided so that a mobile robotic device can recharge battery 322 using the energy storage device within the mobile robotic device. Thus, battery interface 320 may include battery charging circuitry.

Processor 330 may be any form of processor and is preferably a digital processor, such as a general-purpose microprocessor or a digital signal processor (DSP), for example. Processor 330 may be readily programmable; hard-wired, such as an application specific integrated circuit (ASIC); or programmable under special circumstances, such as a programmable logic array (PLA) or field programmable gate array (FPGA), for example. Program memory for processor 330 may be integrated within processor 330, may be part of memory 340, or may be an external memory.

Processor 330 executes one or more programs to control the operation of the other components, to transfer data between the other components, to associate data from the various components together (preferably in a suitable data structure), to perform calculations using the data, to otherwise manipulate the data, and to present results to the customer. For example, processor 330 preferably executes a data presentation module for presenting information, advertising, and other messages to customers.

Digital signage device 300 further includes memory 340, which may be implemented using one or more standard memory devices. The memory devices may include, for instance, RAM 342, ROM 344, or EEPROM devices, and may also include magnetic or optical storage devices, such as hard disk drives, CD-ROM drives, and DVD-ROM drives. Digital signage device 300 also includes memory interface 350 coupled to an internal hard disk drive 352. Interface 350 may also be coupled to an internal drive, such as an optical disk drive, or an external drive, such as a drive coupled to digital signage device 300 over a USB, IEEE 1194, or PCM-CIA connection. Interface 350 may also be coupled to a removable memory 354, such as flash memory. According to one embodiment, a mobile robotic device is configured to exchange removable memory 354 with another removable memory having updated data, updated or additional program modules, or operating system updates. Thus, digital signage device 300 may receive software and data updates without the use of network interface 370.

In one embodiment, any number of program modules are stored in the drives (e.g., drive 352), ROM 344, or removable memory 354, including an operating system (OS) 345, one or more program modules or components 346, and data 347. All or portions of the program modules may also be cached in RAM 342. Any suitable operating system 345 may be employed. One of the program modules 346 may comprise a set of instructions for presenting information, advertising, and other messages to customers. Data 347 may comprise the information, advertising, or other messages presented to the customer.

Input/output controller 360 interfaces to one or more user input devices, such as one or more buttons or other controls. While the input devices may be integrated into digital signage device 300 and coupled to processor 330 via input/output controller 360, the input devices may also connect via other interfaces, such as a connector 362. Connector 362 may include one or more data interfaces, bus interfaces, wired or wireless network adapters, or modems for transmitting and receiving data. Accordingly, input/output controller 360 may include one or more of hardware, software, and firmware to implement one or more protocols, such as stacked protocols along with corresponding layers. Thus, connector 362 may function as a serial port (e.g., RS232), a Universal Serial Bus (USB) port, or an IR interface. Input/output controller 360 may also support various wired, wireless, optical, and other communication standards. According to one embodiment, a mobile robotic device is configured to transfer data to and from digital signage device 300 via connector 362 and input/output controller 360. Thus, digital signage device 300 may receive software and data updates without the use of network interface 370 or removable memory 354.

Network interface 370 may be provided to communicate with an external network. Network interface 370 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), or USB, for example. A wireless connection may use low or high powered electromagnetic waves to transmit data using any wireless protocol, such as Bluetooth™, IEEE 802.11b (or other WiFi standards), infrared data association (IrDa), or radio frequency identification (RFID), for example. Network interface 370 may be omitted in certain embodiments. Thus, digital signage device 300 may receive software and data updates via removable memory 354, connector 362, or both.

One or more of battery operated devices 130 or battery operated devices 230 may comprise a kiosk, such as a photo kiosk or another computer terminal that provides information and operational user interfaces for end users, such as staff or retail customers, to view or operate. Thus, the kiosks can be used to provide and collect information, provide instructions, perform look-ups and transactions, place orders, provide status, or display advertisements or information. The power and data needed to operate a kiosk may be delivered by one or more mobile robotic devices.

Figure 4:
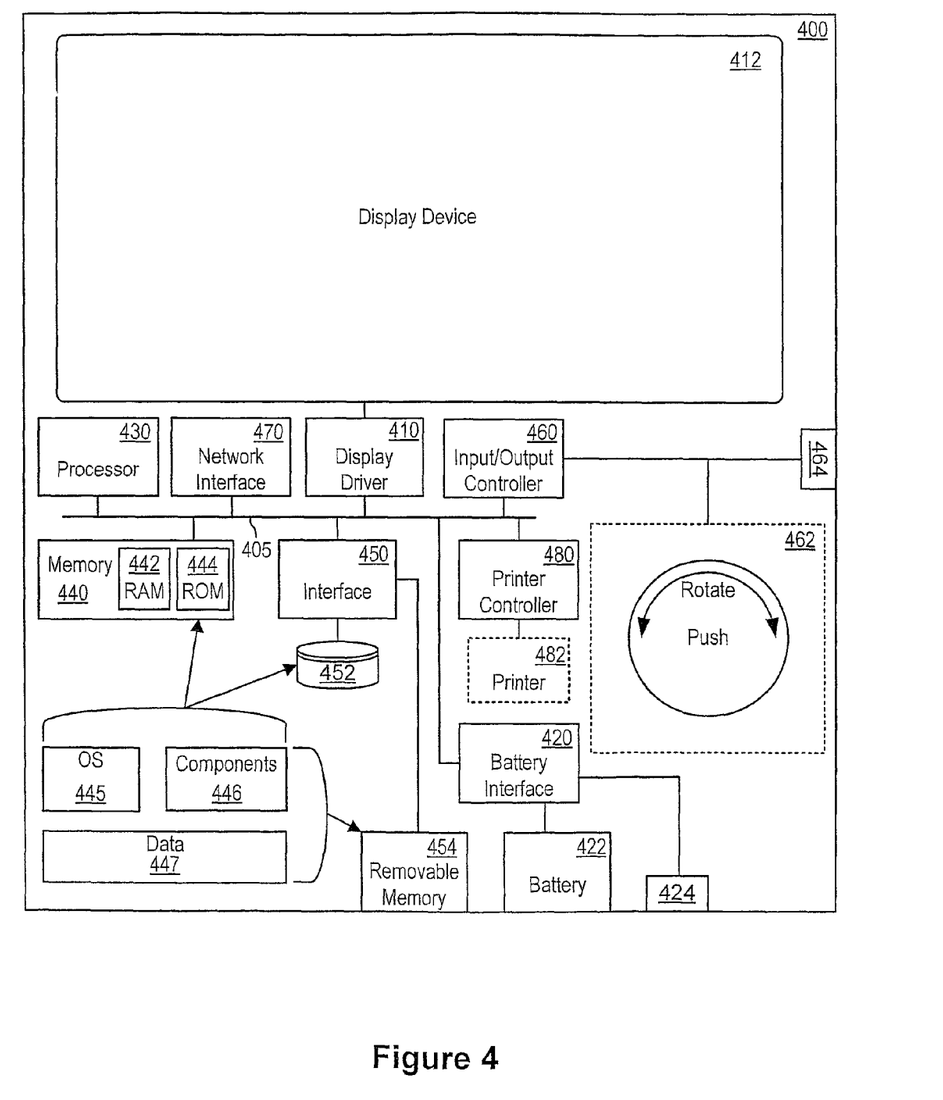

FIG. 4 is a functional block diagram of one illustrative architecture of a kiosk 400. In FIG. 4, a bus-based architecture is illustrated, based on a bus 405. Other types of architectures are also suitable, such a direct connection between one or more of the components. A number of components interface to the bus 405, including a display driver 410, a battery interface 420, a processor 430, a memory 440, a memory interface 450, an input/output controller 460, a network interface 470, and a printer controller 480. Other versions of kiosk 400 may omit one or more of these components, may contain additional components, or both.

Display driver 410 interfaces with processor 430 and a display 412 to present, for example, in textual form, graphical form, or both, data or other information stored in one or more of memories 440 and 452. For example, kiosk 400 may present data, photographs, menus, prompts, indications, and otherwise communicate with the user via one or more display devices 412. Display 412 may comprise any display device, such as an integrated cathode ray tube (CRT), liquid crystal display (LCD), or other display device.

Battery interface 420 interfaces with processor 430 and battery 422 to, for example, detect a charge level of battery 422. If the charge level of battery 422 falls below a certain threshold, processor 430 may be configured to transmit via network interface 470 a message indicating that battery 422 needs replacing or needs to be recharged. Network interface 470 may directly communicate with any of the mobile robotic devices or may communicate with a central monitoring system, which may direct a mobile robotic device to service kiosk 400. Processor 430 may also be configured to transmit via a transmitter a signal indicative of the state of battery 422. For example, if a charge level of battery 422 falls below a certain threshold, the transmitter may begin sending a signal indicating that a mobile robotic device should replace or charge battery 422. By way of another example, the transmitter may transmit a signal when battery 422 has a normal charge level and stop transmitting the signal when a charge level of battery 422 falls below a certain threshold. Battery interface 420 may be omitted in certain embodiments.

According to a preferred embodiment, battery 422 comprises a rechargeable battery, such as a nickel-metal-hydride or lithium-ion battery, having a charge capacity sufficient to power kiosk 400 for several hours (e.g., eight hours). However, battery 422 may comprise a non-rechargeable battery and may comprise any electrical or electrochemical device, such as galvanic cells or electrolytic cells. As will be described with reference to FIGS. 5A and 5B, battery 422 may be housed within a battery compartment of kiosk 400 or may be externally coupled to kiosk 400. If battery 422 comprises a rechargeable battery, battery 422 may be recharged in a number of ways. For example, a mobile robotic device may physically detach or remove battery 422 from kiosk 400 to allow charging by a base station. By way of another example, an access port 424 may be provided so that a mobile robotic device can recharge battery 422 using the energy storage device within the mobile robotic device. Thus, battery interface 420 may include battery charging circuitry.

Processor 430 executes one or more programs to control the operation of the other components, to transfer data between the other components, to associate data from the various components together (preferably in a suitable data structure), to perform calculations using the data, to otherwise manipulate the data, and to present results to the customer. For example, processor 430 preferably executes a one or more modules that provide and collect information, provide instructions, perform look-ups and transactions, place orders, provide status, or display advertisements or information.

Kiosk 400 further includes memory 440, which may be implemented using one or more standard memory devices. The memory devices may include, for instance, RAM 442, ROM 444, or EEPROM devices, and may also include magnetic or optical storage devices, such as hard disk drives, CD-ROM drives, and DVD-ROM drives. Kiosk 400 also includes memory interface 450 coupled to an internal hard disk drive 452. Interface 450 may also be coupled to an internal drive, such as an optical disk drive, or an external drive, such as a drive coupled to kiosk 400 over a USB, IEEE 1194, or PCMCIA connection. Interface 450 may also be coupled to a removable memory 454, such as flash memory. According to one embodiment, a mobile robotic device is configured to exchange removable memory 454 with another removable memory having updated data, updated or additional program modules, or operating system updates. If removable memory 454 has stored thereon data from a user interaction (e.g., order parameters provided by the user), the mobile robotic device may install removable memory 454 into a base station 110 so that the data can be transmitted to a central server. In addition, the mobile robotic device may have a memory interface so that the mobile robotic device can directly read the data stored on removable memory 454 and transmit the data to a central server. Thus, kiosk 400 may provide and collect information, provide instructions, perform look-ups and transactions, place orders, provide status, or display advertisements or information without the use of network interface 470.

In one embodiment, any number of program modules are stored in the drives (e.g., drive 452), ROM 444, or removable memory 454, including an operating system (OS) 445, one or more program modules or components 446, and data 447. All or portions of the program modules may also be cached in RAM 442. Any suitable operating system 445 may be employed. One of the program modules 446 may comprise a set of instructions that provide and collect information, provide instructions, perform look-ups and transactions, place orders, provide status, or display advertisements or information. Data 447 may comprise the provided and collected information, provided instructions, data for performing look-ups and transactions, placed orders, status data, or the advertisements or other information to be displayed.

Input/output controller 460 interfaces to one or more user input devices, such as one or more buttons or other controls.

An axially displaceable rotational input device, such as a rotary push knob 462 may be coupled to processing unit 430 via input/output controller 460 and bus 405. By rotating rotary push knob 462, the user adjusts certain parameters (e.g., color, brightness, and contrast) or navigates various menus (e.g., user prompts). By depressing rotary push knob 462, the user switches from one parameter to another or selects a desired menu or prompt. Rotary push knob 462 may be integrated into an enclosure of kiosk 400 or rotary push knob 462 may connect to kiosk 400 via other interfaces, such a connector 464. Likewise, kiosk 400 may include other input devices coupled to input/output controller 460, such as a keypad or keyboard, a pointing device, a trackball, or other wired or wireless input devices. Accordingly, input/output controller 460 may include hardware, software, firmware, or any combination thereof, to implement one or more protocols, such as stacked protocols along with corresponding layers. Thus, input/output controller 460 may function as a RS232 port, a USB port, an ethernet port, a parallel port, an IEEE 1394 serial port, and an IR interface. Input/output controller 460 may also support various wired, wireless, optical, and other communication standards. While the input devices may be integrated into kiosk 400 and coupled to processor 430 via input/output controller 460, the input devices may also connect via other interfaces, such as connector 464. According to one embodiment, a mobile robotic device is configured to transfer data to and from kiosk 400 via connector 464 and input/output controller 460. Thus, kiosk 400 may provide and collect information, provide instructions, perform look-ups and transactions, place orders, provide status, or display advertisements or information without the use of network interface 470 or removable memory 454.

Network interface 470 may be provided to communicate with an external network and one or more remote servers or data stores. Network interface 470 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), or USB, for example. A wireless connection may use low or high powered electromagnetic waves to transmit data using any wireless protocol, such as Bluetooth™, IEEE 802.11b (or other WiFi standards), infrared data association (IrDa), or radio frequency identification (RFID), for example. Network interface 470 may be omitted in certain embodiments. Thus, kiosk 400 may transfer data via removable memory 454, connector 464, or both.

Kiosk 400 may also include printer controller 480 to interface with a printer 482 (e.g., via a bi-direction port, such as a IEEE 1284 parallel port, or a wired or wireless network connection). Printer 482 may be used to print orders (e.g., photographs), instructions, maps, price quotes, coupons, advertisements, order confirmations, or receipts. According to one embodiment, one or more of mobile robotic devices 120 or 220 are configured to deliver paper to printer 482 and install paper in printer 482.

According to a preferred embodiment, battery operated devices 130 and 230 include a mechanical fastener for coupling and securely holding the battery to the battery operated device. The mechanical fastener preferably resists manual tampering (e.g., by customers) and accidental dislocation. The mobile robotic devices are configured to release and set the mechanical fastener when exchanging the battery. A transmitter may be positioned proximate the mechanical fastener to help guide a mobile robotic device toward the battery operated device, the mechanical fastener, or both.

Figure 5A:
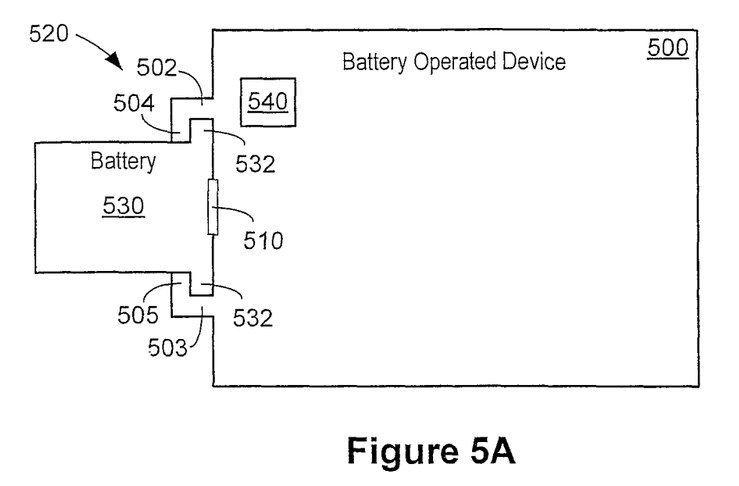
FIGS. 5A and 5B are schematic diagrams of battery interfaces for battery operated devices, according to various embodiments.

FIG. 5A is a schematic diagram of a battery operated device 500 including an electrical battery interface 510 and a mechanical fastener 520 for electrically and mechanically coupling a battery 530 to battery operated device 500, according to one embodiment. Battery 530 may be externally mounted to battery operated device or may be partially or fully set within battery operated device 500. Electrical battery interface 510 may comprise any suitable interface that electrically couples a battery 530 to battery operated device 500. For example, electrical battery interface 510 may comprise an electrical connector, such as plug and socket connector or a male or female contact device that is configured to supply electrical energy from battery 530 to battery operated device 500.

Mechanical fastener 520 may comprise any device or coupling that mechanically joins or affixes two or more objects together. For example, mechanical fastener 520 may comprise lateral side walls 502 and 503 and interlocking shoulders 504 and 505 of battery operated device 500. Lateral side walls 502 and 503 and interlocking shoulders 504 and 505 engage a shoulder or flange protrusion 532 of battery 530 to secure battery 530 to battery operated device 500. An opening may extend orthogonal to lateral side walls 502 and 503 (e.g., proximate the top of battery operated device 500) so that battery 530 may be slid downward (e.g., from the top of battery operated device 500) into engagement with interlocking shoulders 504 and 505. Alternatively, a lateral opening may be provided so that battery 530 may be laterally slid into engagement with interlocking shoulders 504 and 505. Further, a side wall and interlocking shoulder may surround battery 530 and interlocking shoulder may comprise one or more spaced apart flanges that mesh with flange protrusions on battery 530 so that battery 530 may be inserted into the sidewall and twisted to lock battery 530 in place. Mechanical fastener 520 may also comprise another device, such as a latch, pin, or hook-and-loop fastener.

Battery operated device 500 may optionally include one or more transmitters 540 (e.g., an infrared emitter) positioned proximate mechanical fastener 520 to help guide a mobile robotic device toward battery operated device 500, mechanical fastener 520, or both.

Figure 5B:
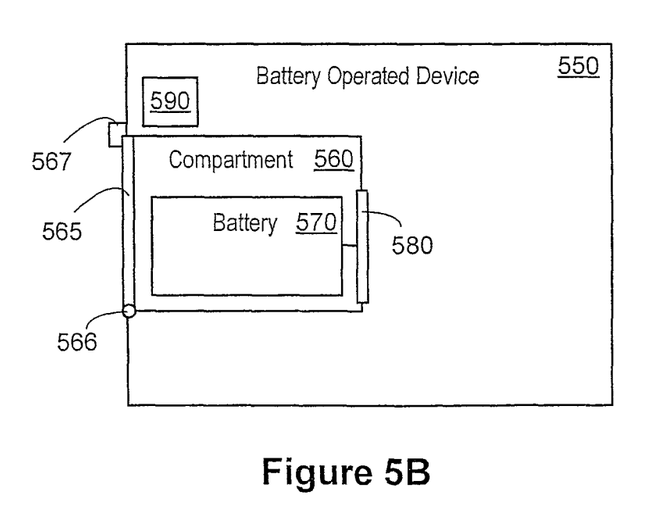

FIG. 5B is a schematic diagram of a battery operated device 550 including a compartment 560 for housing a battery 570, according to one embodiment. An electrical battery interface 580 is provided to electrically couple battery 570 to battery operated device 550. Electrical battery interface 580 may comprise any suitable interface that electrically couples battery 570 to battery operated device 550. For example, electrical battery interface 580 may comprise an electrical connector, such as plug and socket connector or a male or female contact device that is configured to supply electrical energy from battery 570 to battery operated device 550. A door or access panel 565 provides access to compartment 560. A hinge 566 and a mechanical fastener 567 may be provided to secure access panel 565 to battery operated device 550. Mechanical fastener 567 may comprise any device or coupling that mechanically joins or affixes two or more objects together, such as a latch. The mobile robotic devices are configured to release and set mechanical fastener 567 when exchanging the battery. Battery operated device 550 may optionally include one or more transmitters 590 (e.g., an infrared emitter) positioned proximate mechanical fastener 567 to help guide a mobile robotic device toward battery operated device 550, mechanical fastener 567, or both.

Figure 6:
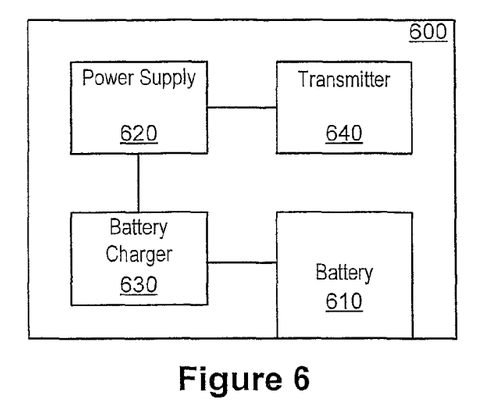
FIGS. 6 and 7 are block diagrams showing operational components of base stations, according to various embodiments.

FIG. 6 is a functional block diagram showing operational components of a base station 600, according one embodiment. Base station 600 is preferably electrically coupled to a power source, such as an electrical receptacle, and is configured to charge one or more batteries 610. Thus, base station 600 may include a power supply 620 and battery charging circuitry 630. Power supply 620 converts the voltage available from the power source (e.g., line voltage) into a voltage suitable for battery charging circuitry 630. Battery charging circuitry 630 may comprise any suitable circuitry for charging one or more batteries and may comprise circuitry to prevent overcharging the batteries. An electrical battery interface may be provided to electrically couple one or more batteries 610 to base station 600. The electrical battery interface may be similar or identical to any of the electrical battery interfaces described with reference to FIGS. 5A and 5B. Base station 600 may also include a mechanical fastener for coupling and securely holding one or more batteries 610 to base station 600. The mechanical fastener may be similar or identical to any of the mechanical fasteners described with reference to FIGS. 5A and 5B. The mobile robotic devices are configured to attach one or more batteries to base station 600 for charging and remove charged batteries from base station 600. Thus, it may be desirable to incorporate in the base station the same electrical battery interface and mechanical fastener that are used with the battery operated device to simplify the design of the battery exchange system of the mobile robotic device.

The mobile robotic devices are preferably configured to determine whether a battery is charged before removing the battery from base station 600. According to one embodiment, the mobile robotic devices wait a predetermined period of time before removing a battery from base station 600. For example, the amount of time to fully charge a depleted battery using base station 600 may be known (e.g., based on a charge capacity of the battery and a battery charging rate of the base station). Thus, a mobile robotic device may have data stored in a memory indicating how long it should take to charge a fully depleted battery. After the mobile robotic device attaches a battery to base station 600, the mobile robotic device may start a charge timer or store an indication of when a particular battery was attached to base station 600. The mobile robotic device will then wait a sufficient amount of time before removing the battery from base station 600 (e.g., the amount of time it should take to charge a fully depleted battery). According to another embodiment, battery charging circuitry 630 is configured to detect a charge level of battery 610 and provide an indication of which batteries (if any) are charged. For example, if a charge level of battery 610 rises above a certain threshold, a transmitter 640 may begin sending a signal indicating that battery 610 is charged and that a mobile robotic device can remove battery 610 from base station 600. By way of another example, transmitter 640 may transmit a signal when a charge level of battery 610 is below a certain threshold and stop transmitting the signal when a charge level of battery 610 rises above the threshold.

Transmitter 640 may be positioned proximate the mechanical fastener to help guide a mobile robotic device toward base station 600, the mechanical fastener, or both. According to a preferred embodiment, transmitter 640 comprises an infrared emitter that functions as an identity and location beacon for the mobile robotic devices. According to another embodiment, an antenna is coupled to transmitter 640 and transmitter 640 comprises a power source and radio frequency (RF) oscillator to drive the antenna with a signal that causes the antenna to radiate one or more RF signals. Because the RF signal(s) may only need to travel a short distance from the antenna, the power requirements for the transmitter may be relatively modest.

Figure 7:
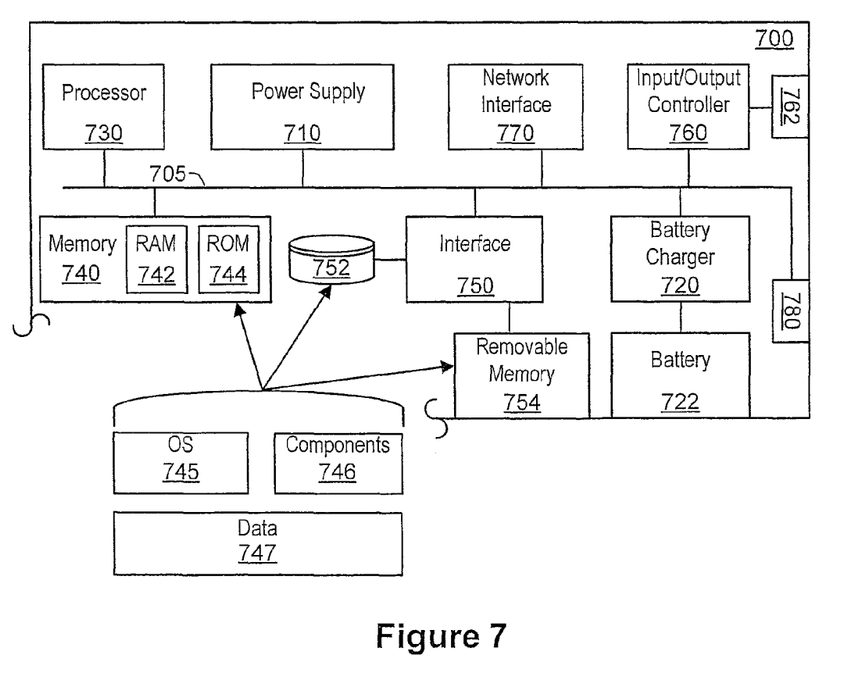

FIG. 7 is a functional block diagram showing operational components of a base station 700, according one embodiment. Base station 700 is preferably configured to transfer data (e.g., via a network interface 770) between one or more central data sources and a memory of base station 700. Thus, a mobile robotic device can transfer data between base station 700 and one or more of the battery operated devices (e.g., if the battery operated device does not include a network interface).

In FIG. 7, a bus-based architecture is illustrated, based on a bus 705. Other types of architectures are also suitable, such a direct connection between one or more of the components. For example, a power supply 710 may be electrically coupled to each of the components. A number of components interface to the bus 705, including power supply 710, a battery charger 720, a processor 730, a memory 740, a memory interface 750, an input/output controller 760, network interface 770, and a transmitter 780. Other versions of base station 700 may omit one or more of these components, may contain additional components, or both.

Base station 700 is preferably electrically coupled to a power source, such as an electrical receptacle, and is configured to charge one or more batteries 722. Thus, base station 700 may include power supply 710 and battery charging circuitry 720. One or more of batteries 722 may be similar or identical to battery 322 or battery 422 described with reference to FIGS. 3 and 4. Power supply 710 converts the voltage available from the power source (e.g., line voltage) into a voltage suitable for battery charging circuitry 720 (and the other components). Battery charging circuitry 720 may comprise any suitable circuitry for charging one or more batteries and may comprise circuitry to prevent overcharging the batteries. An electrical battery interface may be provided to electrically couple one or more batteries 722 to base station 700. The electrical battery interface may be similar or identical to any of the electrical battery interfaces described with reference to FIGS. 5A and 5B. Base station 700 may also include a mechanical fastener for coupling and securely holding one or more batteries 722 to base station 700. The mechanical fastener may be similar or identical to any of the mechanical fasteners described with reference to FIGS. 5A and 5B. The mobile robotic devices are configured to attach one or more batteries to base station 700 for charging and remove charged batteries from base station 700. Thus, it may be desirable to incorporate in the base station the same electrical battery interface and mechanical fastener that are used with the battery operated device to simplify the design of the battery exchange system of the mobile robotic device.

The mobile robotic devices are preferably configured to determine whether a battery is charged before removing the battery from base station 700. For example, the mobile robotic devices wait a predetermined period of time before removing a battery from base station 700 as described with reference to FIG. 6. In addition, base station 700 may be configured to transmit via network interface 770 an indication of which batteries (if any) are charged and ready to be removed. For example, battery charging circuitry 720 may be configured to detect a charge level of battery 722 and provide an indication of which batteries (if any) are charged. Base station 700 can directly relay to a mobile robotic device (e.g., via network interface 770) the battery charge status or can relay to a central monitoring system the battery charge status.

Processor 730 may be any form of processor and is preferably a digital processor, such as a general-purpose microprocessor or a digital signal processor (DSP), for example. Processor 730 may be readily programmable; hard-wired, such as an application specific integrated circuit (ASIC); or programmable under special circumstances, such as a programmable logic array (PLA) or field programmable gate array (FPGA), for example. Program memory for processor 730 may be integrated within processor 730, may be part of memory 740, or may be an external memory.

Processor 730 executes one or more programs to control the operation of the other components, to transfer data between the other components, to associate data from the various components together (preferably in a suitable data structure), to perform calculations using the data, to otherwise manipulate the data, and to present results to the customer. For example, processor 730 may execute a data transfer module, a battery charge status module, and a mobile robotic device guidance module. The data transfer module may be configured to transfer data between a data source and base station 700. The data may comprise advertising data and other messages that digital signage device displays. In addition, the data may comprise data for performing look-ups and transactions, data for placing orders, status data, or advertising data that a kiosk uses. The battery charge status module may be configured to provide an indication of which batteries (if any) are charged and ready to be removed. The mobile robotic device guidance module may be configured to help guide a mobile robotic device toward base station 700.

Base station 700 further includes memory 740, which may be implemented using one or more standard memory devices. The memory devices may include, for instance, RAM 742, ROM 744, or EEPROM devices, and may also include magnetic or optical storage devices, such as hard disk drives, CD-ROM drives, and DVD-ROM drives. Base station 700 may also include memory interface 750 coupled to an internal hard disk drive 752. Interface 750 may also be coupled to an internal drive, such as an optical disk drive, or an external drive, such as a drive coupled to base station 700 over a USB, IEEE 1194, or PCMCIA connection. Interface 750 may also be coupled to a removable memory 754, such as flash memory. According to one embodiment, the mobile robotic devices are configured to exchange removable memory 754 with another removable memory. A mobile robotic device can deliver removable memory 754 to one or more of the battery operated devices so that the battery operated device can receive software and data updates without the use of a network interface.

In one embodiment, any number of program modules are stored in the drives (e.g., drive 752), ROM 744, or removable memory 754, including an operating system (OS) 745, one or more program modules or components 746, and data 747. All or portions of the program modules may also be cached in RAM 742. Any suitable operating system 745 may be employed. One of the program modules 746 may comprise a set of instructions for implementing the data transfer module, the battery charge status module, and the mobile robotic device guidance module. Data 747 may comprise the charge status data and the data that will be transferred by a mobile robotic device between base station 700 and a battery operated device.

Input/output controller 760 interfaces to one or more user input devices, such as one or more buttons or other controls. While the input devices may be integrated into base station 700 and coupled to processor 730 via input/output controller 760, the input devices may also connect via other interfaces, such as a connector 762. Connector 762 may include one or more data interfaces, bus interfaces, wired or wireless network adapters, or modems for transmitting and receiving data. Accordingly, input/output controller 760 may include one or more of hardware, software, and firmware to implement one or more protocols, such as stacked protocols along with corresponding layers. Thus, connector 762 may function as a serial port (e.g., RS232), a Universal Serial Bus (USB) port, or an IR interface. Input/output controller 760 may also support various wired, wireless, optical, and other communication standards. According to one embodiment, a mobile robotic device is configured to transfer data between the mobile robotic device and base station 700. Thus, data can be transferred between the mobile robotic device and base station 700 using connector 762 and input/output controller 760. The mobile robotic device can then transfer the data to a battery operated device, which allows the battery operated device to receive data without the use of a network interface or removable memory 754. Likewise, the mobile robotic device may download data from the battery operated device (e.g., one or more orders placed by customers) and deliver the data to base station 700.

Network interface 770 may be provided to communicate with an external network so that base station 700 can exchange data with a central server. For example, one or more of the battery operated devices may not include a network interface and may instead rely on receiving data updates from a mobile robotic device (e.g., via a removable memory or a data transfer between the mobile robotic device and the battery operated device). Thus, base station 700 may download updated software, data, or both, and store the updates on removable memory 754 (or transfer the updates to a mobile robotic device via input/output controller 760) so that a mobile robotic device can deliver the updates to one or more battery operated devices. Network interface 770 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), or USB, for example. A wireless connection may use low or high powered electromagnetic waves to transmit data using any wireless protocol, such as Bluetooth™, IEEE 802.11b (or other WiFi standards), infrared data association (IrDa), or radio frequency identification (RFID), for example. Network interface 770 may be omitted in certain embodiments.

Transmitter 780 may be positioned proximate the mechanical fastener to help guide a mobile robotic device toward base station 700, the mechanical fastener, or both. Transmitter 780 may be similar or identical to transmitter 640 described with reference to FIG. 6. In certain embodiments, one or more of the mobile robotic devices are configured to deliver paper to a printer associated with a battery operated device and install paper in the printer. Thus, base station 700 may contain a source of paper to be delivered to one or more printers.

Figure 8:
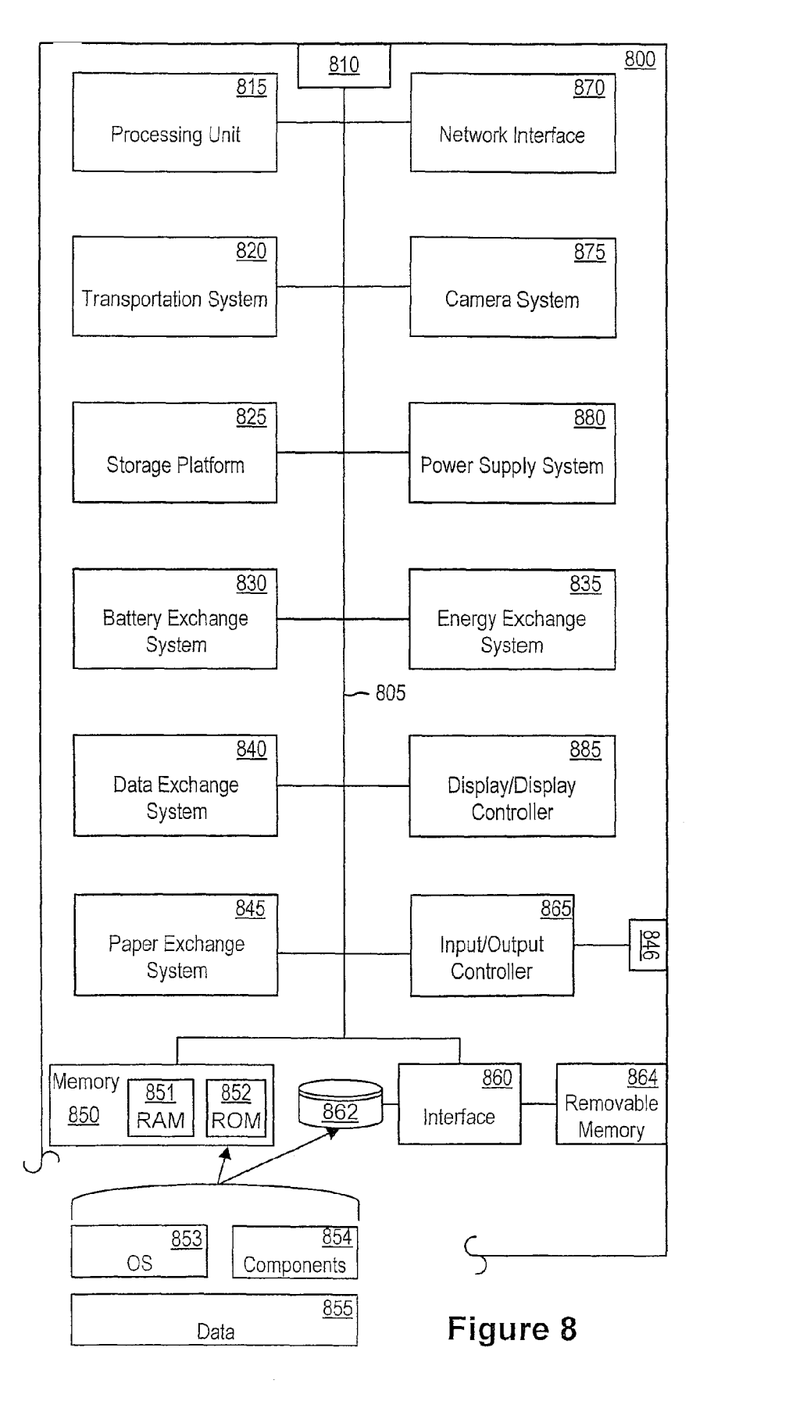
FIG. 8 is a block diagram showing operational components of a mobile robotic device, according to one embodiment.

FIG. 8 is a block diagram showing operational components of a mobile robotic device 800, according to one embodiment. Mobile robotic device 800 is configured to move through an operating environment between one or more battery operated devices and one or more base stations to deliver a charged battery to a battery operated device, according to one embodiment. Thus, mobile robotic device 800 is configured to find and locate one or more batteries installed on a battery operated device, physically remove any installed batteries, and install charged batteries on the battery operated device. According to another embodiment, mobile robotic device 800 is configured to move through an operating environment to deliver electrical energy to a battery operated device.

In FIG. 8, a bus-based architecture is illustrated, based on a bus 805. Other types of architectures are also suitable, such a direct connection between one or more of the components. For example, a power supply 880 may be electrically coupled to each of the components. A number of components interface to the bus 805, including a receiver 810, a processing unit 815, a transportation system 820, a storage platform 825, a battery exchange system 830, a energy exchange system 835, a data exchange system 840, a paper exchange system 845, a memory 850, a memory interface 860, an input/output controller 865, a network interface 870, a camera system 875, power supply system 880, and a display controller 885. Other versions of mobile robotic device 800 may omit one or more of these components, may contain additional components, or both. For example, mobile robotic device 800 may include battery exchange system 830 but not energy exchange system 835 and vice versa. Other elements known in the art, such as a structural framework for interconnecting and supporting the components are included with mobile robotic device 800, but not shown in FIG. 8 for clarity of illustration.

Receiver 810 may be provided to help guide mobile robotic device 800 toward a base station, a battery operated device, or both. Receiver 810 may be positioned proximate battery exchange system 830, energy exchange system 835, data exchange system 840, or paper exchange system 845 to help guide one or more components of the respective system toward an appropriate portion of the base station or battery operated device. For example, receiver 810 may be positioned on or proximate a mechanical fastener actuator associated with battery exchange system 830 to help guide the mechanical fastener actuator toward a mechanical fastener on the base station or battery operated device. In addition more than one receiver may be provided, such as a receiver proximate each of battery exchange system 830, energy exchange system 835, data exchange system 840, and paper exchange system 845, to help guide the respective system toward an appropriate portion of the base station or battery operated device.

According to a preferred embodiment, receiver 810 comprises an infrared receiver configured to identify an infrared signal emitted from the base station or battery operated device (e.g., from an infrared transmitter). According to another embodiment, an antenna, such as a directional antenna, is coupled to receiver 810. Receiver 810 monitors the antenna for the RF signal(s) radiated by the base station or battery operated device (e.g., from a transmitting antenna and corresponding transmitter). The receiver 810 may comprise a wideband filter, an amplifier, and a comparator. The antenna may be coupled to the amplifier via the wideband filter, which is configured to eliminate or filter out unwanted low and high frequency signals which are outside of a preselected range. The comparator then monitors the output from the amplifier for a change in voltage caused by a change in the RF signal(s). The comparator is preferably configured to change states after mobile robotic device 800 or a portion thereof is within a predetermined distance of the base station, battery operated device, or an appropriate section of the base station or battery operated device (e.g., the mechanical fastener).

Processor 815 may be any form of processor and is preferably a digital processor, such as a general-purpose microprocessor or a digital signal processor (DSP), for example. Processor 815 may be readily programmable; hard-wired, such as an application specific integrated circuit (ASIC); or programmable under special circumstances, such as a programmable logic array (PLA) or field programmable gate array (FPGA), for example. Program memory for processor 815 may be integrated within processor 815, may be part of memory 850, or may be an external memory.

Processor 815 executes one or more programs to control the operation of the other components, to transfer data between the other components, to associate data from the various components together (preferably in a suitable data structure), to perform calculations using the data, to otherwise manipulate the data, and to present results to the customer. Processor 815 preferably executes one or more modules that implement the activities of mobile robotic device 800 described herein. For example, processor 815 may execute a transportation module for moving mobile robotic device 800 between a base station and a battery operated device and a battery exchange module that effects replacing a discharged battery on a battery operated device with a charged battery.

Transportation system 820 is configured to transport mobile robotic device 800 between prescribed points. Transportation system 820 may comprise any number of components or mechanisms that effect movement of mobile robotic device 800. For example, transportation system 820 may comprise a motor for driving one or more wheels or continuous tracks. The motor may be controlled with a motor control system and powered by power supply system 880, which may comprise one or more batteries. The motor control system may be coupled to one or more directional sensors or other sensors. For example, one or more proximity sensors may be provided to help mobile robotic device 800 avoid objects while traveling between a battery operated device and a base station. By way of another example, one or more gyroscopes may be provided to monitor and control a direction of travel of mobile robotic device 800. By way of yet another example, one or more sensors may be provided so that mobile robotic device 800 can travel between battery operated device and a base station using a positioning system (e.g., a GPS or positioning system installed within the operating environment).

According to one embodiment, mobile robotic device 800 includes storage platform or portion 825 to support one or more items or objects during transport. Storage platform 825 may be disposed within or externally disposed on mobile robotic device 800. For example, storage platform 825 may be externally disposed so that a battery manipulation mechanism can remove a battery from a base station or a battery operated device and place the removed battery on storage platform 825. Storage platform 825 may be sized and designed to support or store a variety objects as mobile robotic device 800 moves from one location to another. For example, storage platform 825 may be configured to support any combination of a set of batteries (e.g., one or more charged or discharged batteries), a set of removable memories (e.g., one or more removable memories having software updates or data stored thereon), and paper (e.g., paper to be delivered to one or more printers associated with the battery operated devices). Storage platform 825 may also include one or more compartments, containers, or baskets to keep the objects separated and inhibit the objects from shifting (relative to the platform) during transport. According to one embodiment, storage platform 825 includes one or more sensors to monitor how many items are disposed on storage platform 825. For example, storage platform 825 may include a weigh scale to ensure storage platform 825, mobile robotic device 800, or both, do not become overloaded.

According to one embodiment, battery exchange system 830 is provided to remove from a battery operated device a rechargeable battery (which may be fully or partially discharged) and couple to the battery operated device a charged battery (which may be fully or partially charged) from storage platform 825. In addition, battery exchange system 830 removes from a base station a charged battery and couples to the base station a discharged battery from storage platform 825 so that the battery can be recharged. Battery exchange system 830 preferably includes a battery manipulating mechanism configured to support and transport a battery between the battery operated device or base station and storage platform 825. For example, battery exchange system 830 may detachably couple the battery manipulating mechanism to the battery and instruct the battery manipulating mechanism to move the battery from one location to another (e.g., between the battery operated device and the storage platform). Thus, the battery manipulating mechanism may comprise a mechanical or electromechanical gripping mechanism for grabbing and supporting the battery, a mechanical or electromechanical travel mechanism or arm for moving the gripping mechanism (and thus the battery) between prescribed locations, and one or more motors and motor control systems to effect the desired motion. Battery exchange system 830 may also include a mechanical fastener actuator for engaging and disengaging a mechanical fastener (e.g., one of the mechanical fasteners described with reference to FIGS. 5A and 5B) or latch coupling the battery to the battery operated device or base station. For example, the mechanical fastener actuator may comprise an extension coupled to the battery manipulating mechanism and configured to adjusts a position of the mechanical fastener (or a portion thereof) so that the battery can be removed from or attached to the battery operated device or base station.

Battery exchange system 830 may also include an elevation mechanism for adjusting a vertical position of any portion of battery exchange system 830 or mobile robotic device 800. For example, a battery operated device, such as a signage device, may be mounted at ceiling height or another height relative to mobile robotic device 800. Thus, elevation mechanism may move battery exchange system 830 (or a portion thereof) up or down so that battery exchange system 830 can service batteries at any height with respect to a floor. For example, the elevation mechanism may comprise a movable platform (e.g., storage platform 825) supporting the battery manipulating mechanism, the mechanical fastener actuator, or both.

According to a preferred embodiment, mobile robotic device 800 is configured to replace the batteries associated with the battery operated devices during a specified period of time to minimize interfering with customers or users of the battery operated devices. For example, mobile robotic device 800 may be configured to replace the batteries at night or outside of normal business hours. The time interval between battery replacements may be selected based on an average power consumption of the battery operated device and the charge capacity of the battery. In addition, mobile robotic device 800 may communicate with one or more central servers, which monitor a charge level of batteries associated with various battery operated devices and instruct mobile robotic device 800 to replace the batteries having a low charge. Further, mobile robotic device 800 may directly communicate with or monitor a signal transmitted from one or more of the battery operated devices to determine when a battery should be replaced.

When replacing a discharged battery, mobile robotic device 800 first travels to the battery operated device and locates the battery. For example, using receiver 810, mobile robotic device 800 may search for a signal emitted from a transmitter associated with the battery operated device (e.g., a transmitter positioned proximate a mechanical fastener). By way of another example, mobile robotic device 800 may have stored in a memory battery location coordinates. After locating the battery on the battery operated device, mobile robotic device 800 decouples the battery (or a plurality of batteries) from the battery operated device. For example, mobile robotic device 800 may detachably couple to the battery the battery manipulation mechanism (e.g., the gripping mechanism) and use the mechanical fastener actuator to disengaging a mechanical fastener or latch coupling the battery to the battery operated device. After mobile robotic device 800 removes the battery (or a plurality of batteries) from the battery operated device, mobile robotic device 800 places the battery on storage platform 825 using the battery manipulation mechanism (e.g., the travel mechanism or arm) and decouples the battery from the battery manipulation mechanism. After placing the battery on storage platform 825, mobile robotic device 800 may store an indication (e.g., coordinates) of where the discharged battery was placed on storage platform 825 so mobile robotic device can keep a record of which batteries on storage platform 825 are charged and discharged.

After removing the battery from the battery operated device, mobile robotic device 800 installs on the battery operated device a charged battery from storage platform 825. For example, battery exchange system 830 may locate a charged battery on storage platform 825 (e.g., by accessing location coordinates of charged batteries from a memory) and move the battery manipulation mechanism to the charged battery. Mobile robotic device 800 can then detachably couple to the battery the battery manipulation mechanism (e.g., the gripping mechanism) and position the battery proximate the battery operated device. Once the battery is positioned proximate the battery operated device, mobile robotic device 800 couples the battery to the battery operated device (e.g., using the mechanical fastener actuator). For example, the mechanical fastener actuator may engage the mechanical fastener or latch to couple the battery to the battery operated device. After coupling the battery to the battery operated device, mobile robotic device 800 may start timer associated with the battery operated device or send a message to one or more central servers so that mobile robotic device 800 can schedule the next battery replacement.

After replacing the discharged battery on the battery operated device, mobile robotic device may travel to another battery operated device to replace one or more batteries thereon or may travel to one or more base stations so that the discharged batteries may be coupled to one or more base stations to be recharged. After traveling to a base station, mobile robotic device 800 determines whether the base station has installed therein a charged battery (e.g., by accessing local or remote data indicating whether the base station has a charged battery installed therein or by detecting a signal emitted from the base station indicative of whether the base station has any batteries installed therein). If the base station has a charged battery, mobile robotic device 800 locates the charged battery. For example, using receiver 810, mobile robotic device 800 may search for a signal emitted by a transmitter associated with the battery operated device (e.g., a transmitter positioned proximate a mechanical fastener). By way of another example, mobile robotic device 800 may also have stored in a memory battery location coordinates. After locating the charged battery on the base station, mobile robotic device 800 decouples the charged battery (or a plurality of charged batteries) from the base station. For example, mobile robotic device 800 may detachably couple to the charged battery the battery manipulation mechanism (e.g., the gripping mechanism) and use the mechanical fastener actuator to disengaging a mechanical fastener or latch coupling the battery to the base station. After mobile robotic device 800 removes the charged battery (or a plurality of charged batteries) from the base station, mobile robotic device 800 places the charged battery on storage platform 825 using the battery manipulation mechanism (e.g., the travel mechanism or arm) and decouples the battery from the battery manipulation mechanism. After placing the charged battery on storage platform 825, mobile robotic device 800 may store an indication (e.g., coordinates) of where the charged battery was placed on storage platform 825 so mobile robotic device can keep a record of which batteries on storage platform 825 are charged and which batteries are discharged.

After removing the charged battery from the base station, mobile robotic device 800 installs on the base station one of the discharged batteries from storage platform 825. For example, battery exchange system 830 may locate a discharged battery on storage platform 825 (e.g., by accessing location coordinates of discharged batteries from a memory) and move the battery manipulation mechanism to the discharged battery. Mobile robotic device 800 can then detachably couple to the battery the battery manipulation mechanism (e.g., the gripping mechanism) and position the battery proximate the base station. Once the discharged battery is positioned proximate the base station, mobile robotic device 800 couples the discharged battery to the base station (e.g., using the mechanical fastener actuator) so that the base station may charge the battery. For example, the mechanical fastener actuator may engage the mechanical fastener or latch to couple the battery to the base station. After coupling the discharged battery to the base station, mobile robotic device 800 may start a timer associated with the base station or send a message to one or more central servers so that mobile robotic device 800 can determine in the future whether a battery is charged and can be removed from the base station.

According to one embodiment, energy exchange system 835 is provided to transfer electrical energy from a power source to an energy storage device and then transfer the electrical energy from the energy storage device to a rechargeable battery of a battery operated device (e.g., via access port 324 of FIG. 3 or access port 424 of FIG. 4). Energy exchange system 835 includes an energy storage device, such as one or more capacitors (e.g., a high energy density capacitors) or batteries, for storing electrical energy from a power source. The energy storage device preferably has a charge capacity sufficient to charge a discharged battery of a battery operated device.

Energy exchange system 835 includes an electrical connector configured to connect to a power source (e.g., an electrical receptacle) and charging circuitry that couples the connector to the energy storage device. The circuitry is preferably configured to convert the voltage available at the power source to a voltage suitable to charge the energy storage device. The charging circuitry may be configured to rapidly charge the energy storage device so that the mobile robotic device 800 can minimize the time spent charging the energy storage device. Mobile robotic device 800 may be designed to connect to a plurality of power sources. Thus, the electrical connector may be movable relative to the mobile robotic device 800. For example, a travel mechanism or arm (along with one or more motors and motor control systems to effect a desired movement) may be provided for moving the electrical connector to a position suitable to connect to the power source.

Energy exchange system 835 includes a charge delivery mechanism electrically coupled to the energy storage device and configured to transfer electrical energy from the energy storage device to a rechargeable battery of a battery operated device. For example, the charge delivery mechanism may include an electrical connector configured to mate with an access port on the battery operated device (e.g., access port 324, access port 424, or both). Because the access ports may be located in different positions on battery operated devices and the battery operated devices may be positioned at different relative heights, the electrical connector may be movable relative to the mobile robotic device 800. Thus, a travel mechanism or arm (along with one or more motors and motor control systems to effect a desired movement) may be provided for moving the electrical connector to a position suitable to connect to an access port of a battery operated device. Circuitry may also be provided to control power transfer to the battery operated device.

According to a preferred embodiment, mobile robotic device 800 is configured to deliver electrical energy to one or more battery operated devices during a specified period of time to minimize interfering with customers or users of the battery operated devices. For example, mobile robotic device 800 may be configured to deliver electrical energy at night or outside of normal business hours. The time interval between electrical energy deliveries may be selected based on an average power consumption of the battery operated device and the charge capacity of the battery of the battery operated device. In addition, mobile robotic device 800 may communicate with one or more central servers, which monitor a charge level of batteries associated with various battery operated devices and instruct mobile robotic device 800 to deliver electrical energy to the battery operated device having a battery with a low charge. Further, mobile robotic device 800 may directly communicate with or monitor a signal transmitted from one or more of the battery operated devices to determine when to deliver electrical energy.

Before delivering electrical energy to a battery operated device, mobile robotic device 800 must first charge the energy storage device by traveling to a power source. After traveling to a power source, mobile robotic device 800 determines how to position the electrical connector to interface with the power source. For example, mobile robotic device 800 may access local or remote data indicating a position of the power source relative to mobile robotic device 800 (or a portion thereof). By way of another example, mobile robotic device 800 may detect a signal emitted from the power source to help guide the electrical connector to the power source. After determining a relative position of the power source, mobile robotic device 800 couples the electrical connector to the power source so that the power source can charge the energy storage device. After the energy storage device is charged, mobile robotic device 800 travels to the battery operated device.

After travelling to the battery operated device, mobile robotic device 800 determines how to position the electrical connector to interface with an access port of the battery operated device (e.g., by accessing local or remote data indicating a position of the access port relative to mobile robotic device 800 (or a portion thereof) or by detecting a signal emitted from the battery operated device to help guide the electrical connector to the access port). After determining a relative position of the access port, mobile robotic device 800 couples the electrical connector to the access port and so that the electrical energy stored by the energy storage device can be transferred to the battery associated with the battery operated device. After the battery of the battery operated device is charged, mobile robotic device 800 may travel to another battery operated device to charge another battery or travel back to the power source to recharge the energy storage device.

According to one embodiment, data exchange system 840 is provided to transfer data between a battery operated device and mobile robotic device 800 and transfer data between mobile robotic device 800 and a base station. For example, data exchange system 840 may include a data interface, such as an electrical connector, configured to transfer data between a memory of the battery operated device (e.g., via connector 362 and input/output controller 360 of FIG. 3 or connector 464 and input/output controller 460 of FIG. 4) and a memory of mobile robotic device 800 (e.g., memory 850 or 862). The same data interface, or another data interface, may be provided to transfer data between a memory of the base station (e.g., via connector 762 and input/output controller 760) and a memory of mobile robotic device 800 (e.g., memory 850 or 862). Because the connectors may be located in different positions on the battery operated devices and base stations and the battery operated devices and base stations may be positioned at different heights, the data interface may be movable relative to the mobile robotic device 800. Thus, a travel mechanism or arm (along with one or more motors and motor control systems to effect a desired movement) may be provided for moving the data interface to a position suitable to connect to a connector of a battery operated device or a base station.

According to another embodiment, data exchange system 840 is configured to decouple a removable memory from the battery operated device and the base station and place the removable memory on storage platform 825 (or couple the removable memory to interface 860). Thus, data exchange system 840 preferably includes a removable memory manipulating mechanism configured to support and transport a removable memory between the battery operated device or base station and storage platform 825 (or memory interface 860). For example, data exchange system 840 may detachably couple the removable memory manipulating mechanism to the removable memory and instruct the removable memory manipulating mechanism to move the removable memory from one location to another (e.g., between the battery operated device and the storage platform). Thus, the removable memory manipulating mechanism may comprise a mechanical or electromechanical gripping mechanism for grabbing and supporting the removable memory, a mechanical or electromechanical travel mechanism or arm for moving the gripping mechanism (and removable memory) between prescribed locations, and one or more motors and motor control systems to effect the desired motion. Data exchange system 840 may also include an elevation mechanism similar or identical to the elevation mechanism described with reference to battery exchange system 830 for adjusting a vertical position of any portion of data exchange system 840 or mobile robotic device 800.

According to a preferred embodiment, mobile robotic device 800 is configured to transfer data before, during, or after mobile robotic device 800 is replacing a battery or transferring electrical energy. When transferring data between mobile robotic device 800 and a battery operated device, mobile robotic device 800 first travels to the battery operated device and locates the connector (e.g., connector 362 or 464) or removable memory. For example, using receiver 810, mobile robotic device 800 may search for a signal emitted from a transmitter associated with the battery operated device. By way of another example, mobile robotic device 800 may have stored in a memory connector or removable memory location coordinates. After locating the connector or removable memory on the battery operated device, mobile robotic device 800 couples the data interface to the connector (e.g., the travel mechanism or arm may position the data interface proximate to the connector and couple the data interface to the connector) or decouples the removable memory from the battery operated device (e.g., mobile robotic device 800 may detachably couple to the removable memory the removable memory manipulation mechanism (e.g., the gripping mechanism)). If mobile robotic device 800 couples the data interface to the connector, data exchange system 840 transfers data between the mobile robotic device and the battery operated device. If mobile robotic device 800 removes the removable memory from the battery operated device, mobile robotic device 800 places the removable memory on storage platform 825 using the battery manipulation mechanism (e.g., the travel mechanism or arm) and decouples the removable memory from the removable memory manipulation mechanism. After placing the removable memory on storage platform 825, mobile robotic device 800 may store an indication (e.g., coordinates) of where the removable memory was placed on storage platform 825. Mobile robotic device 800 may also install in the battery operated device a removable memory (e.g., have updated software or data stored thereon) from storage platform 825.

After transferring data between the battery operated device and mobile robotic device 800, mobile robotic device 800 may travel to another battery operated device to transfer data or may travel to one or more base stations. After traveling to a base station, mobile robotic device 800 locates the connector (e.g., connector 762) or removable memory. For example, using receiver 810, mobile robotic device 800 may search for a signal emitted from a transmitter associated with the base station. By way of another example, mobile robotic device 800 may have stored in a memory connector or removable memory location coordinates. After locating the connector or removable memory on the base station, mobile robotic device 800 couples to the connector the data interface (e.g., the travel mechanism or arm may position the data interface proximate to the connector and couple the data interface to the connector) or decouples from the base station the removable memory (e.g., mobile robotic device 800 may detachably couple to the removable memory the removable memory manipulation mechanism (e.g., the gripping mechanism)). If mobile robotic device 800 couples the data interface to the connector, data exchange system 840 transfers data between the mobile robotic device and the base station. If mobile robotic device 800 removes the removable memory from the base station, mobile robotic device 800 places the removable memory on storage platform 825 using the battery manipulation mechanism (e.g., the travel mechanism or arm) and decouples from the removable memory manipulation mechanism the removable memory. After placing the removable memory on storage platform 825, mobile robotic device 800 may store an indication (e.g., coordinates) of where the removable memory was placed on storage platform 825. Mobile robotic device 800 may also install in the base station a removable memory (e.g., having data from a battery operated device stored thereon) from storage platform 825.

Paper exchange system 845 may be provided to deliver and install paper in a printer associated with one or more battery operated device. Paper exchange system 845 may also be configured to remove paper from the printer. Paper exchange system 845 preferably includes a paper manipulating mechanism configured to support and transport paper between the base station and storage platform 825 and between storage platform 825 and a printer associated with the battery operated device. For example, paper exchange system 845 may detachably couple the paper manipulating mechanism to the paper or ream of paper and instruct the paper manipulating mechanism to move the paper from one location to another (e.g., between the storage platform and battery operated device). Thus, the paper manipulating mechanism may comprise a mechanical or electromechanical gripping mechanism for grabbing and supporting the paper, a mechanical or electromechanical travel mechanism or arm for moving the gripping mechanism (and paper) between prescribed locations, and one or more motors and motor control systems to effect the desired motion. Paper exchange system 845 may also include an elevation mechanism similar or identical to that described with reference to battery exchange system 830 for adjusting a vertical position of any portion of paper exchange system 845 or mobile robotic device 800.

According to a preferred embodiment, mobile robotic device 800 is configured to install paper before, during, or after mobile robotic device 800 is replacing a battery or transferring electrical energy. When delivering paper to the printer, mobile robotic device 800 first travels to the battery operated device and locates a paper installation location (e.g., by searching for a signal emitted from the printer or by accessing the paper installation location coordinates from a memory). After locating the paper installation location, mobile robotic device 800 installs the paper. For example, paper exchange system 845 may locate paper or a ream of paper on storage platform 825 (e.g., by accessing location coordinates from a memory) and move the paper manipulation mechanism to the paper. Mobile robotic device 800 can then detachably couple to the paper (or ream of paper) the paper manipulation mechanism (e.g., the gripping mechanism) and install the paper.

After installing the paper, mobile robotic device may travel to another printer to install paper therein or may travel to one or more base stations to place additional paper on storage platform 825. After traveling to a base station, mobile robotic device 800 locates a paper source (e.g., by searching for a signal emitted from the base station or by accessing the paper source location coordinates from a memory). After locating the paper source, mobile robotic device 800 transfers paper from the base station to storage platform 825. For example, paper exchange system 845 may move the paper manipulation mechanism to the paper and mobile robotic device 800 may detachably couple to the paper (or ream of paper) the paper manipulation mechanism (e.g., the gripping mechanism) and transfer the paper storage platform 825. Mobile robotic device 800 may store in a memory a location of paper on storage platform so mobile robotic device 800 can locate the paper after traveling to the battery operated device.

Mobile robotic device 800 further includes memory 850, which may be implemented using one or more standard memory devices. The memory devices may include, for instance, RAM 851, ROM 852, or EEPROM devices, and may also include magnetic or optical storage devices, such as hard disk drives, CD-ROM drives, and DVD-ROM drives. Mobile robotic device 800 also includes memory interface 860 coupled to an internal hard disk drive 862. Interface 860 may also be coupled to an internal drive, such as an optical disk drive, or an external drive, such as a drive coupled to mobile robotic device 800 over a USB, IEEE 1194, or PCMCIA connection. Interface 860 may also be coupled to a removable memory 864, such as flash memory. Thus, mobile robotic device 800 may couple a removable memory from a base station or battery operated device to interface 860 to transfer data between the removable memory and memories 850 or 862.

In one embodiment, any number of program modules are stored in the drives (e.g., drive 862) or ROM 852 including an operating system (OS) 853, one or more program modules or components 854, and data 855. All or portions of the program modules may also be cached in RAM 851. Any suitable operating system 853 may be employed. Program modules 854 may comprise a set of instructions to implement the functions of mobile robotic device 800 described herein.

An input/output controller 865 may be provided to interface to one or more user input devices, such as one or more buttons or other controls. Mobile robotic device 800 may include other input devices coupled to input/output controller 865. Accordingly, input/output controller 865 may include hardware, software, firmware, or any combination thereof, to implement one or more protocols, such as stacked protocols along with corresponding layers. Thus, input/output controller 865 may function as a RS232 port, a USB port, an ethernet port, a parallel port, an IEEE 1394 serial port, and an IR interface. Input/output controller 865 may also support various wired, wireless, optical, and other communication standards. While the input devices may be integrated into mobile robotic device 800 and coupled to processor 815 via input/output controller 865, the input devices may also connect via other interfaces, such as connector 846. Thus, mobile robotic device 800 may transfer data to and from a base station or battery operated device via connector 846 and input/output controller 865.

A network interface 870 may be provided to communicate with an external network. For example, mobile robotic device 800 may communicate with one or more base stations, one or more battery operated device, and one or more central servers to exchange data and receive instructions (e.g., which batteries should be replaced). Network interface 870 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), or USB, for example. A wireless connection may use low or high powered electromagnetic waves to transmit data using any wireless protocol, such as Bluetooth™, IEEE 802.11b (or other WiFi standards), infrared data association (IrDa), or radio frequency identification (RFID), for example. Network interface 870 may be omitted in certain embodiments.

According to one embodiment, a camera system 875 is provided to capture one or more images as mobile robotic device 800 travels between a battery operated device and a base station. Camera system 875 may comprise an illumination source, a lens assembly, and an imager. The illumination source may comprise any source of light, such as light emitting diodes (LEDs), flash strobes, or incandescent or fluorescent lamps. The lens assembly may comprise any number of lenses for focusing light on the imager. The lens assembly may also comprise a zoom lens coupled to processor 815 to control an amount of optical zoom. The imager forms an electronic image of one or more objects. The imager may comprise a wide range of image sensing devices for converting an optical image (or another wave in the electromagnetic spectrum) into an electrical signal. For example, the imager may be a digital camera, such as a charge-coupled device (CCD) camera or complimentary metal-oxide semiconductor (CMOS) camera, both of which form an array of pixels, which together constitute an electronic representation of the image. Each pixel location stores data indicative of the light intensity at that location of the image. The light intensity data for each pixel may be a color-coded vector (e.g., red-green-blue) or monochrome intensity (e.g., grayscale). The captured images may be stored in memory 850, memory 862, or removable memory 864 and used for any number of purposes, such as performing a photographic and spatial survey of isles, retail shelves, and the surrounding environment. The captured images may also be used to generate three-dimensional store models for easy navigation and remote viewing. According to one embodiment, one or more of the battery exchange system 830, energy exchange system 835, data exchange system 840, and paper exchange system 845 are omitted from mobile robotic device 800. In other words, mobile robotic device 800 may be configured to perform a photographic and spatial survey of isles, retail shelves, and the surrounding environment without exchanging a discharged battery coupled to a battery operated device with a charged battery, for example.

Power supply system 880 supplies mobile robotic device with electrical energy sufficient to perform prescribed operations. Power supply system 880 comprises a rechargeable battery that can be recharged by a mobile robotic device docking station, one or more of the base stations, one or more of the power sources, or at other prescribed points of the operating environment (e.g., remote computer(s) may access the captured images via a network, such as the Internet).

According to one embodiment, a display driver 885 interfaces with processor 815 and a display to present, for example, in textual form, graphical form, or both, data or other information stored in one or more of memories 850 and 862. For example, mobile robotic device 800 may present data, menus, prompts, and otherwise communicate with the user via one or more display devices, which may comprise any suitable display device, such as an integrated cathode ray tube (CRT), liquid crystal display (LCD), or other display device.

As used herein, a component or module may comprise hardware, software, firmware, or any combination thereof (e.g., self-contained hardware or software components that interact with a larger system). Embodiments may include various steps, which may be embodied in machine-executable instructions to be executed by processing unit 815 or another processor. Thus, embodiments may be provided as a computer program product including a machine-readable storage medium having stored thereon instructions (in compressed or uncompressed form) that may be used to program a computer (or other electronic device) to perform processes or methods described herein. In addition, the steps may be performed by hardware components that include specific logic for performing the steps or by a combination of hardware, software, and firmware. A result or output from any step, such as a confirmation that the step has or has not been completed or an output value from the step, may be stored (in a memory), displayed (on a display), printed (on a printing device), or transmitted over a wired or wireless network (via a network interface).

Embodiments may also be provided as a computer program product embodied on a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product embodied on a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. An automated battery exchange system for exchanging a discharged battery coupled to a battery operated device with a charged battery, comprising:
   a battery operated device positioned within an operating environment characterized by areas accessible to retail customers, the battery operated device comprising a display for presenting data to one or more retail customers in the operating environment and a rechargeable battery for powering the battery operated device;
   a base station remotely located from the battery operated device, the base station electrically coupled to a power source and configured to charge a discharged rechargeable battery to provide a charged rechargeable battery; and
   an autonomous mobile robotic device comprising:
      a transportation system for moving the autonomous mobile robotic device between the battery operated device and the base station,
      a storage platform for supporting a set of rechargeable batteries that includes at least one charged battery, and
      a battery exchange system configured to:
         autonomously decouple from the battery operated device the discharged rechargeable battery and include it as a discharged member of the set of rechargeable batteries supported on the storage platform,
         autonomously couple to the battery operated device the at least one charged battery from the set of rechargeable batteries supported on the storage platform,
         autonomously decouple from the base station the charged rechargeable battery, and
         autonomously couple to the base station the discharged member of the set of rechargeable batteries supported on the storage platform,
      wherein the autonomous mobile robotic device is configured to travel between the battery operated device and the base station so that the battery exchange system can autonomously exchange the discharged rechargeable battery from the battery operated device with the at least one charged battery from the set of rechargeable batteries supported on the storage platform after the autonomous mobile robotic device travels to the battery operated device and autonomously exchange the charged rechargeable battery from the base station with the discharged member of the set of rechargeable batteries supported on the storage platform after the autonomous mobile robotic device travels to the base station.

2. The system of claim 1, wherein the battery operated device further comprises an input device for accepting data from a user.

3. The system of claim 1, wherein the battery operated device comprises a photo kiosk system.

4. The system of claim 1, wherein the autonomous mobile robotic device is configured to travel between the battery operated device and the base station only during a specified period of time to thereby reduce interference with the retail customers while they are moving to locations within the area of the operating environment.

5. The system of claim 1, wherein the battery operated device is positioned within the operating environment in a location having no electrical receptacle located near the battery operated device for powering the battery operated device, and the base station is positioned in a location having a readily accessible electrical receptacle for powering the base station so that the base station can charge the discharged rechargeable battery.

6. The system of claim 1, wherein the base station is configured to charge a plurality of rechargeable batteries.

7. The system of claim 1, wherein the base station includes a transmitter for guiding the autonomous mobile robotic device toward the base station.

8. The system of claim 1, wherein the battery operated device includes a memory for storing data, the base station includes a network interface for communicatively coupling to the base station a remote data store, the autonomous mobile robotic device includes a memory for storing data, and the autonomous mobile robotic device includes a data exchange system configured to transfer between the memory of the battery operated device and the memory of the autonomous mobile robotic device data and transfer between the memory of the autonomous mobile robotic device and the remote data store data so that data is available to be relayed between the remote data store and the memory of the battery operated device as the autonomous mobile robotic device travels between the base station and the battery operated device.

9. The system of claim 1, wherein the battery operated device includes a removable memory, the base station includes a removable memory, the base station includes a network interface configured to transfer between a remote data store and the removable memory of the base station data, the storage platform is configured to support a set of removable memories, and the autonomous mobile robotic device includes a data exchange system configured to decouple from the battery operated device the removable memory, couple to the battery operated device a removable memory from the set of removable memories supported on the storage platform, decouple from the base station a removable memory, and couple to the base station a removable memory from the set of removable memories supported on the storage platform so that data is available to be relayed between the remote data store and the battery operated device as the autonomous mobile robotic device travels between the base station and the battery operated device and exchanges at the base station and the battery operated device the removable memories.

10. The system of claim 1, wherein the battery operated device includes a mechanical fastener for coupling the at least one charged battery to the battery operated device and the battery exchange system is configured to disengage the mechanical fastener so that the discharged rechargeable battery is available to be decoupled from the battery operated device and engage the mechanical fastener so that the at least one charged battery is available to be coupled to the battery operated device.

11. The system of claim 10, wherein the battery operated device includes a transmitter proximate the mechanical fastener, the transmitter configured to guide the autonomous mobile robotic device toward the battery operated device and the mechanical fastener.

12. The system of claim 1, wherein the autonomous mobile robotic device further comprises:
   a camera system configured to capture a plurality of images as the autonomous mobile robotic device travels between the battery operated device and the base station; and
   a memory for storing the plurality of captured images.

13. The system of claim 1, wherein the battery operated device includes a printing device and paper for the printing device, the base station includes a paper source, the storage platform is configured to support paper, and the autonomous mobile robotic device includes a paper delivery system configured to transfer paper from the paper source to the storage platform and transfer paper from the storage platform to the battery operated device.

14. An automated energy delivery system for operation within an operating environment characterized by areas accessible to retail customers, so as to deliver electrical energy to one or more battery operated devices, comprising:
   a battery operated device positioned within the operating environment, the battery operated device comprising a display for presenting data to one or more users in the operating environment and a rechargeable battery for powering the battery operated device; and
   an autonomous mobile robotic device comprising:
      a transportation system for moving the autonomous mobile robotic device between the battery operated device and a power source,
      an energy storage device configured to store electrical energy from the power source, and
      an energy exchange system for autonomously transferring electrical energy from the power source to the energy storage device, and for autonomously transferring electrical energy from the energy storage device to the rechargeable battery,
   wherein the autonomous mobile robotic device is configured to travel between the battery operated device and the power source so that the energy exchange system can transfer electrical energy from the power source to the energy storage device after the autonomous mobile robotic device travels to the power source and the energy exchange system can transfer electrical energy from the energy storage device to the rechargeable battery for charging the rechargeable battery after the autonomous mobile robotic device travels to the battery operated device.

* * * * *